United States Patent
Black et al.

(10) Patent No.: US 8,266,303 B2
(45) Date of Patent: *Sep. 11, 2012

(54) MANAGING NETWORK CONNECTIONS

(75) Inventors: Chuck A. Black, Rocklin, CA (US); Lin A. Nease, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,033

(22) Filed: Jan. 9, 2012

(65) Prior Publication Data

US 2012/0117218 A1    May 10, 2012

Related U.S. Application Data

(62) Division of application No. 12/359,544, filed on Jan. 26, 2009, now Pat. No. 8,117,321.

(51) Int. Cl.
*G06F 15/173* (2006.01)
*G06F 15/16* (2006.01)

(52) U.S. Cl. ..................... 709/228; 709/226

(58) Field of Classification Search .............. 709/223, 709/226–228
See application file for complete search history.

(56) References Cited

U.S. PATENT DOCUMENTS

| | | | |
|---|---|---|---|
| 5,953,316 A | 9/1999 | Lazar et al. | |
| 6,094,687 A | 7/2000 | Drake et al. | |
| 6,138,161 A | 10/2000 | Reynolds et al. | |
| 6,226,263 B1 | 5/2001 | Iwase et al. | |
| 8,117,321 B2 * | 2/2012 | Black et al. | 709/228 |
| 2002/0027906 A1 | 3/2002 | Athreya et al. | |
| 2005/0021777 A1 | 1/2005 | Nakao et al. | |
| 2007/0118663 A1 | 5/2007 | Nguyen | |
| 2007/0198524 A1 | 8/2007 | Branda et al. | |
| 2008/0005285 A1 | 1/2008 | Robinson et al. | |
| 2008/0275992 A1 | 11/2008 | Basty et al. | |

* cited by examiner

*Primary Examiner* — Joseph Avellino
*Assistant Examiner* — James Conaway

(57) ABSTRACT

Connections for sources to connect to a network are managed by storing connection profiles identifying network attributes for the connections. Each connection profile includes a status of available or subscribed. Requests for connections are received. If a stored connection profile is available that matches the request, the connection for the matching connection profile is assigned to the source.

21 Claims, 4 Drawing Sheets

200

210 - POD
211 - POD NAME
212 - OWNER
213 - LIST OF CONNECTION CLASSES

220 - CONNECTION CLASS
221 - CONNECTION CLASS NAME
222 - NETWORK ATTRIBUTES
 - VLAN
 - ACL
 - QoS
 - RATE LIMITING
223 - SERVER ATTRIBUTES
 - SUBNET ADDRESS
 - DEFAULT GATEWAY
 - DNS SERVER(S)
224 - NOTIFICATIONS
225 - LIST OF CONNECTIONS

230 - CONNECTION
231 - CONNECTION NAME
232 - IP ADDRESS
233 - MAC ADDRESS

CONNECTION DATABASE 112

*FIG. 2*

MANAGING NETWORK CONNECTIONS

CROSS-REFERENCE TO RELATED APPLICATIONS

Claim for Priority

This application is a divisional application of U.S. patent application Ser. No. 12/359,544, filed on Jan. 26, 2009 now U.S. Pat. No. 8,177,321, which is hereby incorporated by reference in its entirety.

The present application is related to U.S. patent application Ser. No. 12/359,547, filed on Jan. 26, 2009, entitled "Source Configuration Based on Connection Profile" by Black et al., and U.S. patent application Ser. No. 12/359,536, filed on Jan. 26, 2009, entitled "Network Edge Switch Configuration Based On Connection Profile" by Black et al., both of which are incorporated by reference in their entireties.

BACKGROUND

Many datacenters today consist of large numbers of servers connected to large numbers of networks. The tasks of allocating, provisioning, and maintaining server-to-network connections is difficult and often inefficient.

In many instances, especially with respect to large data centers or with respect to organizations with a large information technology (IT) group, there may be one group of network administrators for managing the network, and one group of server administrators for managing the servers and the applications running on the servers. Allocating, provisioning, and maintaining server-to-network connections is typically an ad hoc process which requires communication between both groups of administrators. For example, a trouble ticket is passed between the server administrator and the network administrator in order to arrive at an agreement about when, where, and how to configure and plug in a server into a network, and how the network should be configured, and how other network devices such as firewalls and load balancers should be changed in order to accommodate the new, or changed, server. This process is cumbersome and prone to error and misunderstandings, and can often lead to misconfigurations, loss of connectivity, and possibly to network outages. Also, there is not much management or accountability in this process. As a result, allocating, provisioning, and maintaining server-to-network connections becomes difficult, and inefficient, and creates a greater risk of network failures.

BRIEF DESCRIPTION OF DRAWINGS

The embodiments of the invention will be described in detail in the following description with reference to the following figures.

FIG. 2 illustrates a data model for a connection profile, according to an embodiment;

DETAILED DESCRIPTION OF EMBODIMENTS

Figure 1:
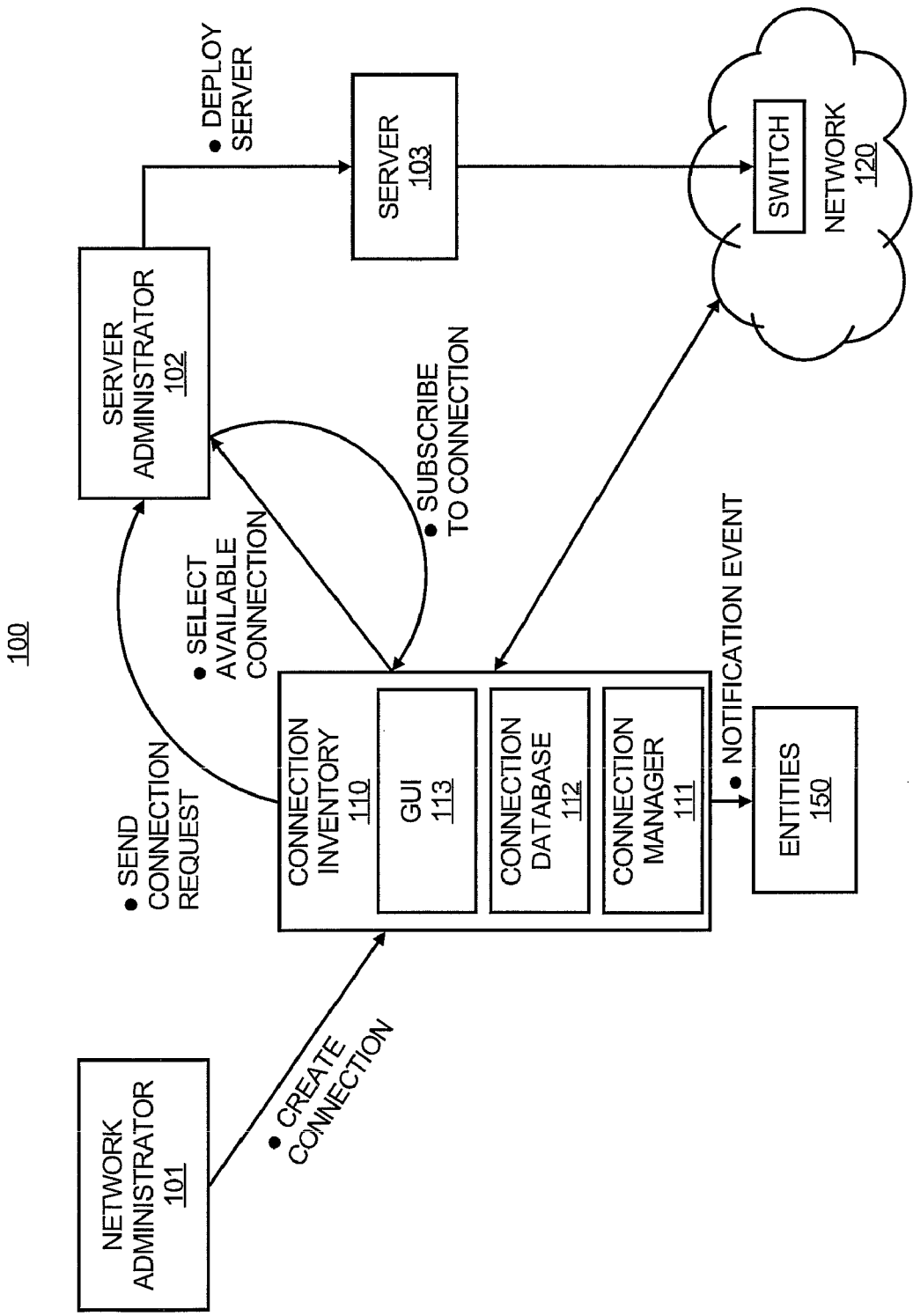
FIG. 1 illustrates a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a connection manager manages connections for a network. A connection is a network connection for a source. The connection provides the source with a connection to the network and to devices connected to the network. The source may be a network device, such as a computer system or network interface. In one embodiment, the source is a network interface, such as a network interface card (NIC) or virtual NIC (VNIC) for a virtual machine. The connection includes a recognized unique ID, such as a media access control (MAC) address, for the NIC or VNIC. For example, a computer system, such as a server, may have 2 NICs and 4 VNICs, each with its own unique address. Each of the NICs and virtual machines has a connection. In another example, a personal computer (PC) may have a two NICs, one for wired and one for wireless. Each has its own MAC address and connection. A network switch, which is a network device that connects network segments (e.g., a router, bridge, hub, repeater, etc.), receives traffic having a recognized MAC address and forwards the traffic on a network segment toward a destination. If a MAC address is not recognized, the packet may be dropped, and thus no connection is available for that MAC address.

The connection manager is configured to create connections for sources. Creating a connection includes storing a connection profile, which represents that a connection is available for use. The connection profile includes network attributes about the connection, and a hierarchy of information, such as a pod and a connection class. A network administrator may make determinations, such as whether resources are available to support a new connection, before creating the connection. Once the connection is created and is thus made available for use, the connection may be subscribed through a matching process in response to a connection request. Once subscribed, the connection is reserved and cannot be used by other sources. The source and a switch, such as an edge switch which provides entry into an enterprise or service provider network, are then configured for the connection, and the connection is used for the source's network traffic.

The connection manager makes managing connections easier by creating connections based on pre-defined connection classes, and allowing server administrators to subscribe to available connections, instead of having to go back and forth with a network administrator to create and make available a network connection. As a result, networking functionality is made more reliable, more robust, and easier to manage for network and server administrators alike.

FIG. 1 illustrates a system 100, according to an embodiment. The system 100, in addition to showing the components of the system 100, describes functionality performed by the components for deploying a new server 103. The system 100 includes a network administrator 101 and a server administrator 102, both of which may include computer systems for the administrators to perform the functions described herein. The system 100 also includes a connection inventory 110 including a connection manager 111, a connection database 112 storing connection profiles and other information, and a graphic user interface (GUI) 113.

The server administrator 102 needs to deploy a new server, shown as server 103, in a data center. A network connection is needed to connect the server 103 to a network 120 in the data center. The server administrator 102 requests a network connection for the server 103. The request may specify the connection class for the connection, which includes the network attributes needed for the connection. The connection request may be sent to the connection inventory 110. In one example, the network and server administrators 101 and 102 use the GUI 113 to interact with the connection inventory 110. For example, the server administrator 102 uses the GUI 113 to log into the connection inventory 110 and send the connection request to the connection inventory 110. Although not shown, the server administrator 102 may alternatively send the connection request to the network administrator 101.

The network administrator 101 creates connection profiles for connections. Creating a connection profile includes storing the connection profiles in the connection database 112. For example, the network administrator 101 uses the GUI 113 to log into the connection inventory 110 and store the connection profiles in the connection database 112.

In response to the connection request from the server administrator 102, the connection manager 111 determines whether any connection profiles are stored in the connection database 112 that match the connection request and are available. Information in the connection profiles, such as connection class, network attributes, etc., is used to match a connection profile with the requested connection. If a match is found, the connection manager selects the available connection profile and sends an indication of the selection to the server administrator 102. The server administrator 102 then sends an indication to subscribe to the selected connection. The connection manager 111 then changes the status of the connection profile for the connection from available to subscribed. The selected connection profile is then reserved (i.e., subscribed) and cannot be used for any other sources. The server administrator 102 can now deploy the server 103, and switches can be configured for the connection. For example, an edge switch in the network 120 may authenticate and store a MAC address for a NIC in the server 103. The server 103 may then use the connection, shown as subscribed connection 130, to send and receive packets to and from the network 120. The connection manager 111 may send notification events to entities 150, indicating a change of a connection status (e.g., available or subscribed). The entities 150 may include the network administrator 101, the server administrator 102, management applications for managing the network, or other entities.

The connection profiles may include a hierarchy of information for each connection. FIG. 2 shows the connection database 112, and a data model 200 of a hierarchy of information stored in each connection profile, according to an embodiment. The data model 200 includes a pod 210 and a connection class 220. A pod is a physically and logically distinct set of networking devices, including core, distribution and edge networking devices, and servers. For example, a data center may support different companies, and servers and networking devices for company A are in one pod and servers and networking devices for company B are in another pod. The pod 210 includes a pod-name 211, an owner 212, and a list of connection classes 213.

The connection class defines the attributes of the network specific to that class of connection. The connection class includes a name 221, network attributes 222, server attributes 223, notifications 224 and a list of connections 225 for that connection class. The network attributes 222 include but are not limited to VLAN, access control list (ACL), quality of service (QoS), and rate-limit. In one example, a datacenter may have a three-tiered structure (e.g., an external layer for sending/receiving traffic to/from the Internet, an application layer, and a database layer), and each layer may have one or more connection classes. A database connection class has network attributes specific to that layer, and so on for each of the other layers.

VLAN is generally equivalent to an Internet Protocol (IP) subnet and identifies a domain for the connection class. Typically there is a range of IP values assigned to each subnet. In a datacenter with the three-tiered structure described above, each layer may have its own VLAN. Traffic that does not belong to the VLAN is not accepted into the VLAN.

An ACL is used to filter traffic for the VLAN. For example, if a VLAN is created for an accounting department, the ACL is used to only allow packets for the accounting VLAN to enter the VLAN. The ACL identifies the traffic authorized for the VLAN. The ACL may identify ports for routing that restrict traffic into the VLAN.

QoS is associated with routing packets in the network and can be used to specify an appropriate location in a queue in a switch for packets. For example, a voice-over-IP (VoIP) packet may have a high QoS, because VoIP applications cannot tolerate significant delay. Thus, VoIP packets may have a higher QoS than another type of data packet, and the VoIP may be put ahead of other packets in the VLAN.

Rate-limiting can be used to determine when packets are dropped. If the rate of traffic received in a buffer in a switch exceeds a threshold, then packets are dropped.

The server attributes 223 specify the attributes for the server being configured. Examples of server attributes include subnet address, default gateway, and DNS sever(s) for the class.

The notifications 224 identify whether an entity, such as one or more of the entities 150 shown in FIG. 1, are sent notifications in response to a status change of a connection for the class stored in the connection database 112. The notifications 224 also identify which entities receive the notifications of status changes. The list of connections 225 (i.e., connection profiles) stored in the connection database 112 for the class may also be stored.

The connection 230 is an instance of a connection in the connection class, and inherits the attributes of the connection class 220, such as the attributes 222, 223, and the notifications 224. The list of connections 225 list all the instances of the connections, for example by name. The connection 230 includes a connection name 231, an IP address 232, and a MAC address 233. The IP address is the address of the source, and the MAC address is the address of the NIC in the source.

Figure 3:
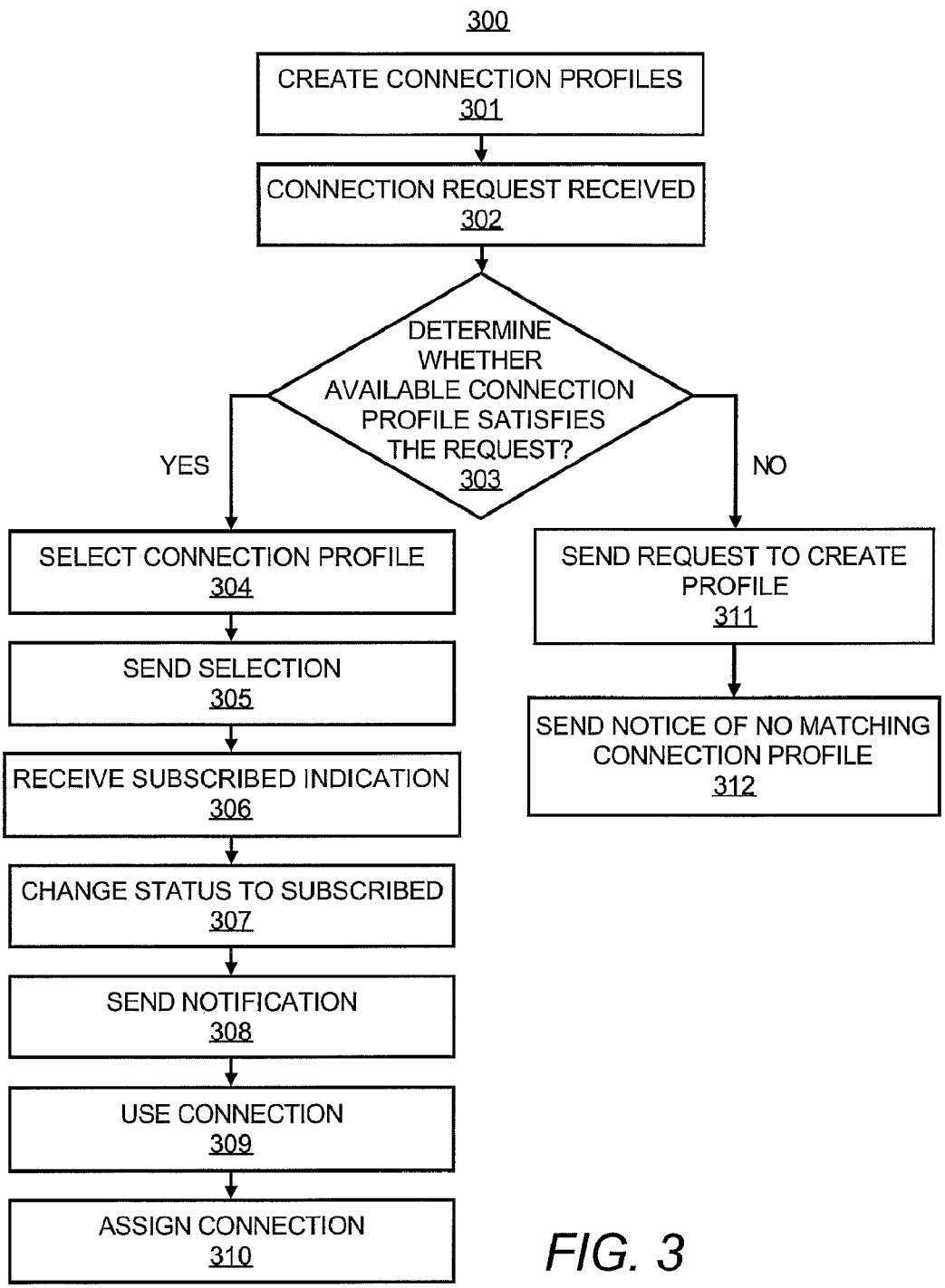
FIG. 3 illustrates a method for managing connection profiles, according to an embodiment.

FIG. 3 illustrates a method 300 for managing network connections, according to an embodiment. The method 300 is described with respect to FIGS. 1 and 2 by way of example and not limitation. It should be noted that one or more of the steps of the method 300 may be performed in different orders.

At step 301, connection profiles are created. For example, the system administrator 101 in FIG. 1 stores connection profiles in the connection database 112. The profiles include the features of the data model 200 shown in FIG. 2. For example, each connection profile specifies a pod and a connection class. A connection profile for a connection in a connection class has all the attributes of the connection class. Pods and connection classes may also be created by network administrator 101 as needed.

Also, each connection profile includes a status of available or subscribed. When a connection is created, it is available until it is subscribed and is eventually used by a source to send and receive network traffic.

At step 302, a connection request is received. For example, the server administrator sends a connection request to the connection inventory 110, because a connection is needed for the server 103. The connection request may specify a pod and connection class or other attributes for the requested connection, so a determination can be made as to whether an available connection profile is stored in the connection database 112 that satisfies the request.

At step 303, the connection manager 111 determines whether an available connection profile is stored in the connection database 112 that satisfies the request. For example, the connection manager 111 queries the connection database 112 using a pod and connection class specified in the request.

At step 304, if a connection profile is available that satisfies the request, the connection manager 111 selects the connection profile.

At step 305, an indication of an available connection satisfying the request is sent to the server administrator 102. If multiple available connection profiles satisfying the request are found, one connection profile is selected either by the connection manager 111 or the server administrator 102.

At step 306, an indication that the selection connection profile is subscribed is received at the connection manager 111. For example, the server administrator 102 determines that the connection profile is appropriate for the server 103, and subscribes to the connection for that connection profile by sending an indication to subscribe to the connection profile to the connection manager 111.

In some instances, the server administrator 102 may determine that the selected connection profile is not what is needed for the server 103 or no response to the indication from step 305 is received at the connection manager 111 within a predetermined period of time (i.e., a timeout is reached). In these instances, the selected connection profile remains available and is not subscribed.

At step 307, the status of the selected connection profile is changed from available to subscribed. Now the connection for the connection profile is reserved for the request.

At step 308, a notification of the status change is sent to designated entities for the connection class, such as a particular server administrator and network administrator.

At step 309, the connection for the subscribed connection profile is used after configuring the server to use the connection. This may include configuring the IP address of the server and configuring an edge switch for the server to accept traffic for the server on the connection.

At step 310, the connection for the matching connection profile is assigned to the source. This includes storing an instance of the connection for the connection class in the connection database 112. The instance may specify the connection name, and IP and MAC address of the source and NIC for the connection.

If an available connection profile that satisfies the connection request is not stored in the connection database 112 as determined at step 303, then the connection manager 111 sends a request to the network administrator 101 to create a profile for the requested connection at step 311. Also, at step 312, a notice is sent to the requestor, such as the server administrator 102, that no available connections that satisfy the request currently exist but a request to create a connection profile for the requested connection has been sent to the network administrator 101.

Figure 4:
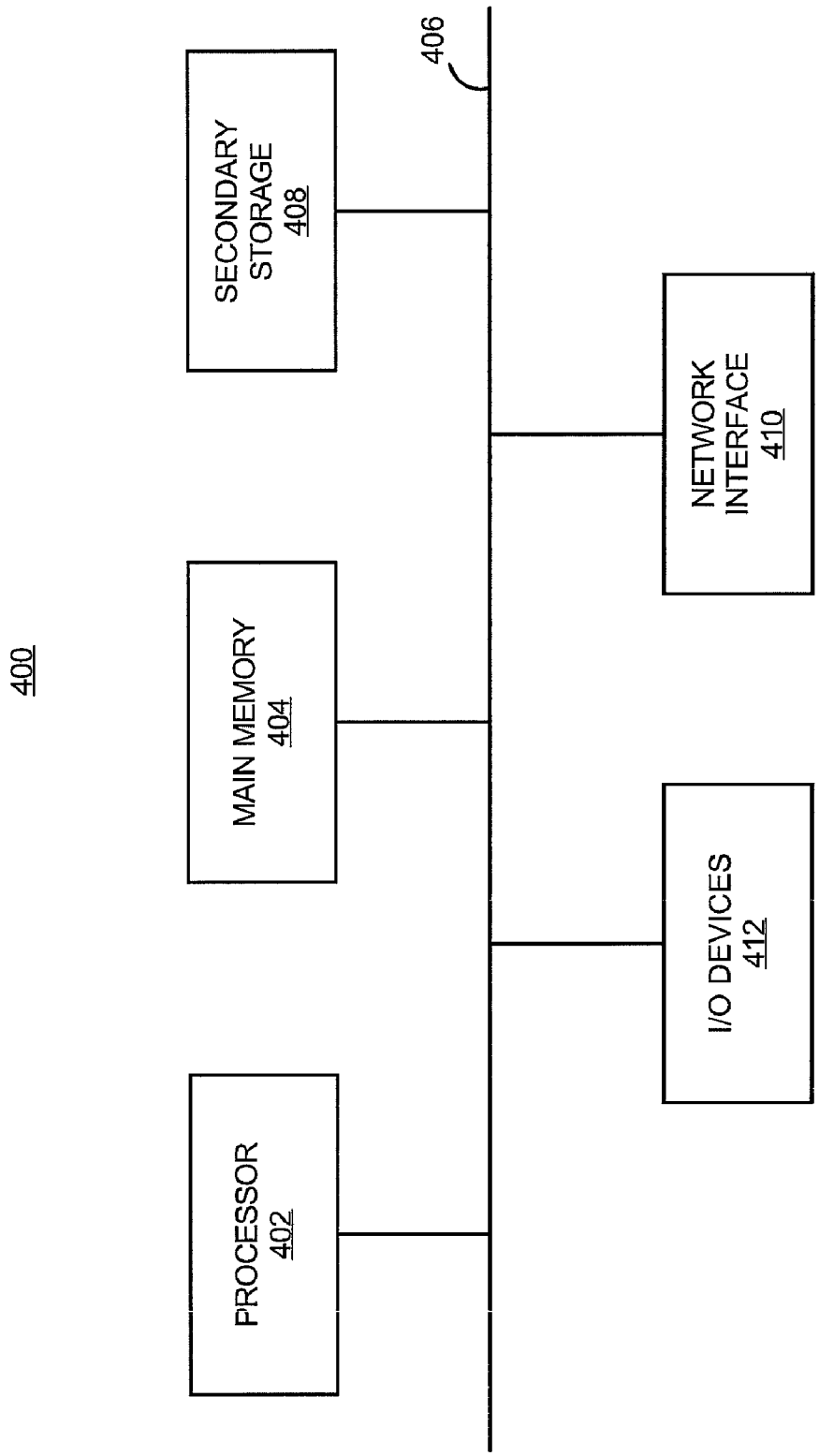
FIG. 4 illustrates a computer system that may be used a platform for the systems and methods of the embodiments.

FIG. 4 illustrates a block diagram of a general purpose computer system 400 that is operable to be used to execute one or more computer programs implementing the embodiments described herein, including steps described herein. The computer system 400 may be used as a platform for the connection inventory 110. It will be apparent to one of ordinary skill in the art that a more sophisticated computer system is operable to be used. Furthermore, components can be added or removed from the computer system 400 to provide the desired functionality.

The computer system 400 includes one or more processors, such as processor 402, providing an execution platform for executing software. Commands and data from the processor 402 are communicated over a communication bus 406. The computer system 400 also includes computer readable storage mediums including a main memory 404, such as a Random Access Memory (RAM), where software is resident during runtime, and a secondary storage 408. The secondary storage 408 includes, for example, a hard disk drive and/or a removable storage drive representing a floppy diskette drive, a magnetic tape drive, a compact disk drive, etc., or a nonvolatile memory where a copy of the software is stored. In one example, the secondary storage 408 also includes ROM (read only memory), EPROM (erasable, programmable ROM), EEPROM (electrically erasable, programmable ROM). The computer system 400 includes one or more input/output (I/O) devices 412, such as a display, keyboard, a mouse, a stylus, and the like. A network interface 410, wired and/or wireless, is provided for communicating with other computer systems.

One or more of the steps of the methods described herein and other steps described herein and one or more of the components of the systems described herein may be implemented as software code stored on a computer readable medium, such as the memory and/or secondary storage, and executed on a computer system, for example, by a processor. For example, the steps of the embodiments may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A method for managing network connections, the method comprising:
    storing connection profiles for connections in a connection database, wherein the connections are connections for network devices to connect to a network, and the connection profiles identify network attributes for the connections and each connection profile includes a status of available indicating that the connection for the connection profile is available to be assigned to one of a plurality of the network devices or a status of subscribed indicating that the connection for the connection profile is reserved for a network device and prevented from being assigned to another network device while the reserved connection is not being used by the network device;
    wherein each connection profile includes a pod and a connection class in the pod, and the pod identifies a set of network devices and the connection class identifies network attributes for the connection;
    receiving a request for a connection needed by a network device, the request including a pod and a connection class for the connection; and
    if a stored connection profile is available and matches the pod and connection class of the request, assigning the connection for the matching connection profile to the network device.

2. The method of claim 1, further comprising:
    matching network attributes for the connection needed by the network device to network attributes in the stored connection profiles that are available to determine if a matching connection profile exists.

3. The method of claim 1, wherein the network attributes include a virtual local area network (VLAN) for the connection, an access control list identifying authorized traffic on the connection, a quality of service (QoS) for the connection, and rate-limiting for the connection.

4. The method of claim 1, wherein the connection class in each connection profile further comprises server attributes including a subnet address, a default gateway, and a domain name system (DNS) server.

5. The method of claim 1, wherein the connection class in each connection profile further comprises notifications associated with providing notifications when a change in status of the connection for the connection profile is determined.

6. The method of claim 1, further comprising:
identifying a connection class for the request; and
matching the connection class for the request to the stored connection profiles that are available and are in the same connection class as the request to determine if a matching connection profile exists.

7. The method of claim 1, further comprising:
for each subscribed connection profile, storing an ID for the connection for the connection profile, an Internet Protocol (IP) address for a network device for the connection, and a media access control (MAC) address for the network device.

8. The method of claim 1, further comprising:
changing the status of the matching connection profile from available to subscribed.

9. The method of claim 8, further comprising:
sending a notification of the change of status to one or more of a network administrator and a server administrator.

10. The method of claim 9, further comprising:
prior to storing the connection profiles, determining whether network resources are available for the connections for the connection profiles; and
storing the connection profiles if the network resources for the connections are available.

11. A method comprising:
storing connection profiles for connections in a connection database, wherein the connections are connections for network devices to connect to a network, and the connection profiles identify network attributes for the connections and each connection profile includes a status of available indicating that the connection for the connection profile is available to be assigned to one of a plurality of the network devices or a status of subscribed indicating that the connection for the connection profile is reserved for a network device and prevented from being assigned to another network device while the reserved connection is not being used by the network device;
wherein each connection profile is generic to a set of network devices and identifies network attributes for the connection associated with the connection profile;
receiving a request for a connection needed by a network device, wherein the request includes information for network attributes of the requested connection; and
if a stored connection profile is available and matches the network attributes of the requested connection, assigning the connection for the matching connection profile to the network device.

12. The method of claim 11, further comprising:
matching the network attributes for the requested connection with network attributes in the stored connection profiles that are available to determine if a matching connection profile exists.

13. The method of claim 11, wherein the network attributes for the connection profiles include a virtual local area network (VLAN) for the connection, an access control list identifying authorized traffic on the connection, a quality of service (QoS) for the connection, and rate-limiting for the connection.

14. The method of claim 11, wherein each connection profile is in a connection class comprising the network attributes for the connection profile.

15. The method of claim 14, wherein the connection class for each connection profile further comprises notifications associated with providing notifications when a change in status of the connection for the connection profile is determined.

16. The method of claim 14, further comprising:
identifying a connection class for the request; and
matching the connection class for the request to the stored connection profiles that are available and are in the same connection class as the request to determine if a matching connection profile exists.

17. The method of claim 14, wherein each connection class comprises server attributes including a subnet address, a default gateway, and a domain name system (DNS) server.

18. The method of claim 11, further comprising:
for each subscribed connection profile, storing an ID for the connection for the connection profile, an Internet Protocol (IP) address for a network device for the connection, and a media access control (MAC) address for the network device.

19. The method of claim 11, further comprising:
changing the status of the matching connection profile from available to subscribed.

20. The method of claim 19, further comprising:
sending a notification of the change of status to one or more of a network administrator and a server administrator.

21. A non-transitory computer readable medium including machine readable instructions that are executable by a processor to:
store connection profiles for connections in a connection database, wherein the connections are connections for network devices to connect to a network, and the connection profiles identify network attributes for the connections and each connection profile includes a status of available indicating that the connection for the connection profile is available to be assigned to one of a plurality of the network devices or a status of subscribed indicating that the connection for the connection profile is reserved for a network device and prevented from being assigned to another network device while the reserved connection is not being used by the network device;
wherein each connection profile is generic to a set of network devices and identifies network attributes for the connection associated with the connection profile;
receive a request for a connection needed by a network device, wherein the request includes information for network attributes of the requested connection; and
if a stored connection profile is available and matches the network attributes of the requested connection, assign the connection for the matching connection profile to the network device.

* * * * *